May 2, 1933.  F. X. MALOCSAY  1,906,700
CIGAR HANDLING MACHINE
Filed June 18, 1931
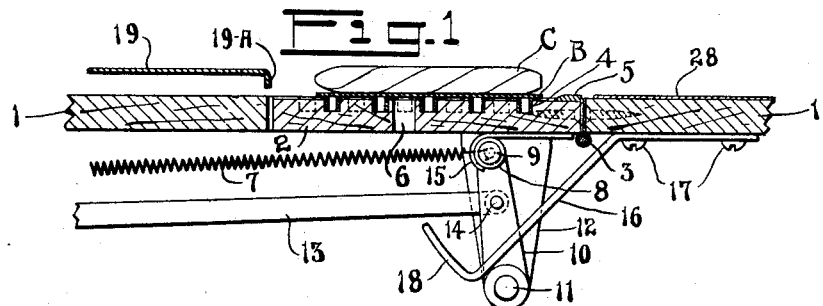
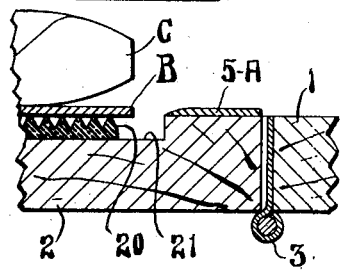
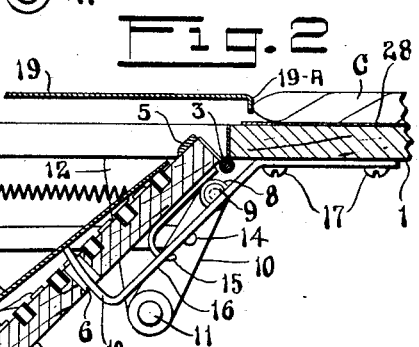
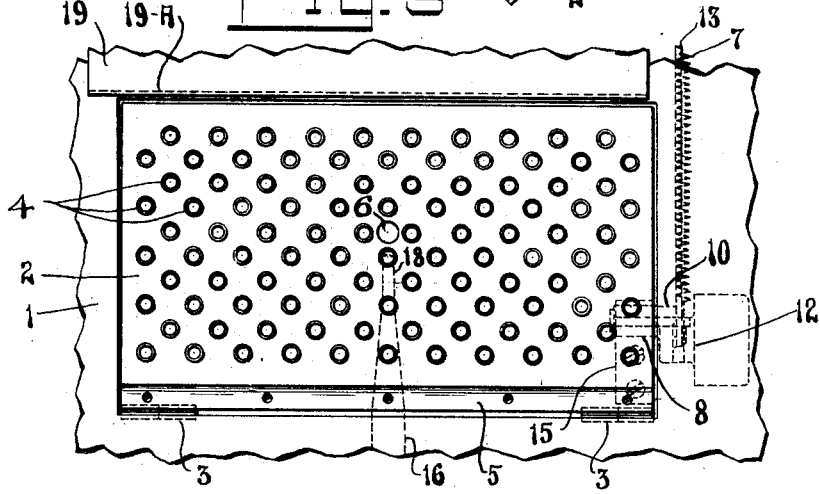
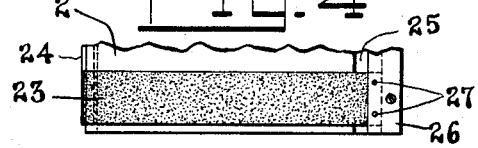
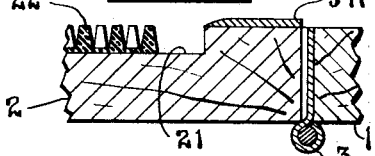
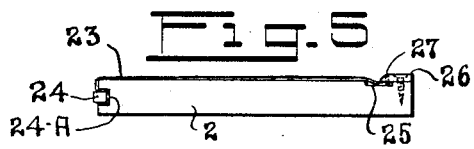
INVENTOR
Francis X. Malocsay
BY Schechter Roth
his ATTORNEYS Patented May 2, 1933

1,906,700

UNITED STATES PATENT OFFICE

FRANCIS X. MALOCSAY, OF UPPER SADDLE RIVER, NEW JERSEY, ASSIGNOR, BY MESNE ASSIGNMENTS, TO COMMERCIAL INVESTMENT TRUST INCORPORATED, A CORPORATION OF NEW YORK

CIGAR HANDLING MACHINE

Application filed June 18, 1931. Serial No. 545,182.

The invention is adapted to be used in connection with a hopper feed mechanism such as that illustrated and described in my patent application of March 2, 1931, Serial Number 519,347; said mechanism being so constructed to retain rows of cigars with spacer boards or trays between them in a stacked formation, and to discharge a single row of said cigars upon a conveyor belt while retaining the spacer or tray and discharging it into a separate receiver; and it is in connection with this last mentioned operation that this invention is particularly related.

It is among the general objects of the present invention to provide a trap door which will cooperate with an automatic cigar hopper and feed mechanism to discharge the spacers or trays which segregate the rows of cigars.

Another object of the invention is to provide a trap door for a cigar hopper which will grip the spacers or trays which segregate the rows of cigars regardless of the size or shape thereof, and securely hold the spacer or tray while the cigars are being discharged to a conveyor; and then discharge the spacer or tray into another part of the machine.

Other more specific objects and advantages of the apparatus will appear as the nature of the improvements is better understood, the invention consisting substantially in the novel arrangement and correlation of instrumentalities herein fully described and illustrated in the accompanying drawing wherein similar reference characters are used to describe corresponding parts throughout the several views and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint. It will be understood that the various features of the invention may be separately applicable despite their cooperation herein shown.

The inventive idea involved is capable of receiving a variety of mechanical expressions, several of which for the purpose of illustration are shown in the accompanying drawing, in which—

Fig. 1 is a cross-sectional view of my improved cigar hopper trap door illustrating its operating mechanism and my preferred form of spacer or tray gripping means which consists of numerous pieces of rubber tubing inserted in the top surface of the door;

Fig. 2 is a similar view illustrating the door in its open position with the spacer or tray in the act of dropping from it;

Fig. 3 is a plan view of my trap door in its closed position;

Fig. 4 is a plan view of part of a trap door illustrating another form of spacer or tray gripper which consists of a number of strips of emery cloth evenly spaced and held in position by retaining bars;

Fig. 5 is an end view of Fig. 4;

Fig. 6 is a part sectional view illustrating another form of spacer gripper which consists of rubber matting having a serrated surface; and Fig. 7 is a similar view illustrating another form of gripper which consists of rubber matting having a surface formed of staggered rows of frustums of small cones.

With particular reference to the drawing, it will be noted that the conventional operating means for opening and closing the trap door, and the means for retaining the rows of cigars in a stacked formation is not shown. The operation of these parts and their construction are identical with those described and illustrated in my patent application of March 2, 1931, Serial Number 519,347, as already mentioned herein, and with particular reference to that specification, a complete understanding of this invention as to its objects and operation may be obtained.

Referring to the various figures, numeral 1 indicates a table upon which is mounted the hopper mechanism with which the trap door 2 is associated. The trap door is located in an aperture cut in the table for this purpose and is pivotally connected to one side of this aperture by the hinges 3. In the top surface of the trap door a series of blind holes have been drilled to receive the short pieces of rubber tubing 4. These pieces of tubing extend slightly above the surface of the door as illustrated most clearly in Fig. 2 and serve as a gripping means to retain the spacers or trays B in position when the pusher plate 19 pushes the cigars C forward by means of its downwardly extending flange 19—A. The beveled bar 5 serves to guide the cigars upon the conveyor belt 28 as illustrated in Fig. 2.

The door is normally held flush with the top of the table by a spring 7. One end of this spring is anchored to the underside of the table, said anchorage not being shown in the drawings and its other end is hooked around an extension of the pivot pin 9 which carries the roller 8, said roller being located at the free end of the lever 10 which is pivoted to the bracket 12 by means of the pin 11. The bracket is secured to the table 1. The lever 10 is pivotally connected at 14 to the link 13 which is connected to the driving mechanism of the pusher 19 by a lost motion slot connection which is not shown in the drawing. The roller 8 engages the hook 15 secured to the underside of the door and when they are in the position illustrated in Fig. 1, the trap door is prevented from dropping under the weight of the cigar stack. The operation of opening and closing the door will be more fully described hereinafter.

Centrally located in the door is the aperture 6 which is large enough to allow the end 18 of the hook 16 to pass through it as illustrated in Fig. 2. The hook is fastened to the table 1 by the screws 17. The purpose of this hook is to raise the spacer away from the gripper to allow it to be discharged by gravity into a receiver.

Referring to Figs. 4 and 5, numeral 23 represents a strip of emery cloth. A plurality of these strips are secured to the surface of the door, but for the purpose of illustration I have only shown one. These strips of emery cloth constitute another method of forming a gripper or gripping surface for the spacers B. One end of the emery strips is held in position by the bar 26 which carries the sharp-pointed pins 27 for this purpose. The portion of the bar that carries these pins overhangs the groove 25; the depth of which is about equal to the thickness of the emery cloth. The sinking of ends of the cloth in this groove insures a parallel relation between the surface of the door and the bar 26 when it is secured in position. The bar 26 is located at the hinge side of the door and is of such thickness to have its top surface in the same plane with the top of a spacer and serves the same purpose as that already described herein in connection with the bar 5 illustrated in Figs. 1, 2 and 3. The other ends of the emery strips are securely held in position by the square bar 24 which squeezes the cloth into the groove 24—A as illustrated most clearly in Fig. 5. The square bar 24 is held in position by small screws which I have not shown in the drawing.

Referring to Fig. 6, the rubber matting 20 having a serrated surface, represents another form of spacer gripping means which may be employed to retain the spacers in position upon the door when the cigars are pushed forward by the pusher 19. The rubber matting is secured to the surface 21 of the door.

Another form of spacer gripping means which may be employed is the rubber matting 22 illustrated in Fig. 7. This form of matting consists of staggered rows of frustums of small cones.

Having thus described my invention in detail, I will now describe its operation.

After a row of cigars and its spacer have been deposited upon the trap door as illustrated in Fig. 1, the pusher 19 starts to move forward and its flange 19—A pushes the row of cigars C forward with it. The bottom edge of the flange clears the spacer B which remains stationary due to the frictional grip of the rubber tubes 4 upon its bottom surface. When approximately three-quarters of the length of the cigars have passed over the bar 5, the link 13 starts to swing the lever 10 forward against the pull of the coil spring 7. As the lever moves forward, the roller 8 pushes slightly upward against the hook 15 until the lever has passed its dead center. This causes the door to swing upward but its movement is so slight that it does not interfere with the forward movement of the pusher 19 or the cigars. The purpose of having the lever go past its dead center as illustrated in Fig. 1 is to create a lock which will hold the door in its closed position when the weight of the cigar stack is placed upon it.

As the lever 10 continues to move past its dead center, the roller 8 rolls along the underside of the hook 15 which allows the door to swing downward until it takes the position illustrated in Fig. 2. During the downward swing of the door, the spacer B is held in position by the rubber grippers 4 until approximately two-thirds of its movement has been traversed; at which time the end 18 of the hook 16 enters the aperture 6. When the end of the hook strikes the spacer, it raises it away from the frictional grippers 4 which allows the spacer to slide downward into a receiver of any suitable sort. After the spacer has been discharged the pusher 19 and the link 13 start backward. The link is moved backward by the pull of the spring 7 and this action forces the roller 8 against the hook 15; this action causing the door to be swung upward into its closed position. The spring 7 continues to pull upon the lever 10 until it has again passed its dead center and forces the roller 8 to engage the curved end of the hook 15 which completes the movement of the lever and the link 13. The door is again locked in its closed position and ready to receive the next row of cigars.

While in this specification I have shown various gripping means adapted to retain the spacers when the rows of cigars are discharged, I wish it distinctly understood that my invention is not limited to the particular forms shown and described, and that I can use any form of gripping means which will have the proper frictional contacting surface. It may be of a resilient material such as a spongy rubber material in which the top has a very effective gripping surface, or any other type of material which will have the required frictional surface so as to make the proper contact with the spacers boards.

In accordance with the provisions of the patent statutes, I have described my invention, but I desire it understood that it is not confined to the particular forms shown and described, the same being merely illustrative, and that the invention can be carried out in other ways without departing from the spirit of my invention, and therefore I claim broadly the right to employ all equivalent instrumentalities coming within the scope of the appended claims, and by means of which, objects of my invention are attained and new results accomplished, as it is obvious that the particular embodiments herein shown and described are only some of many that can be employed to attain these objects and accomplish these results.

Having now described my invention, what I claim, and desire to secure by Letters Patent, is:—

1. A trap door for a cigar handling machine capable of supporting a plurality of rows of cigars in a stack formation with spacers segregating said rows of cigars, said door having means for retaining said spacers thereon when said rows of cigars are discharged.

2. A trap door for a cigar handling machine capable of supporting a plurality of the rows of cigars in a stack formation with spacers segregating said rows of cigars, said door having means for retaining said spacers thereon when said rows of cigars are discharged, and means for opening the door to discharge said spacers.

3. A trap door for a cigar handling machine capable of supporting a plurality of rows of cigars in a stack formation with spacers segregating said rows of cigars, said door having means for retaining said spacers thereon when said rows of cigars are discharged, means for opening the door to a spacer discharge position, and means for releasing the spacers from said retaining means.

4. A trap door for a cigar handling machine capable of supporting a plurality of rows of cigars in a stack formation with spacers segregating said rows of cigars, said door having frictional holding means for retaining said spacers thereon when said rows of cigars are discharged.

5. A trap door for a cigar handling machine capable of supporting a plurality of rows of cigars in a stack formation with spacers segregating said rows of cigars, said door having frictional holding means for retaining said spacers thereon when said rows of cigars are discharged, and means for opening the door to discharge said spacers.

6. A trap door for a cigar handling machine capable of supporting a plurality of rows of cigars in a stack formation with spacers segregating said rows of cigars, said door having frictional holding means for retaining said spacers thereon when said rows of cigars are discharged, means for opening the door to a spacer discharge position, and means for releasing the spacers from said frictional holding means.

7. In a cigar handling machine, a trap door adapted to receive a row of cigars and an intervening spacer, means for longitudinally moving said row of cigars from the trap door, and means on said trap door for retaining said spacers thereon when the row of cigars is discharged.

8. In a cigar handling machine, a trap door adapted to receive a row of cigars and an intervening spacer, means for longitudinally moving said row of cigars from the trap door, and means for discharging the said spacer from the trap door.

9. In a cigar handling machine, a trap door adapted to receive a row of cigars and an intervening spacer, means for longitudinally moving said row of cigars from the trap door, and resilient frictional means on said trap door for retaining said spacers thereon when the row of cigars is discharged.

10. In a cigar handling machine, a trap door adapted to receive a row of cigars and an intervening spacer, means for longitudinally moving said row of cigars from the trap door and means cooperating with said trap door so as to raise the spacer from the trap door and to discharge the same.

11. In a cigar handling machine, a trap door adapted to receive a row of cigars and an intervening spacer, means for longitudinally moving said row of cigars from the trap door, means for moving said trap door, and a stationary member adapted to discharge said spacers from the trap door, while the latter is in motion.

12. In a cigar handling machine, a trap door, provided with a perforation and a frictional contacting surface and adapted to receive a row of cigars, as well as an intervening spacer, means for longitudinally moving said row of cigars from the trap door and means for moving said trap door and for discharging said spacer from the trap door, said last mentioned means comprising a stationary hooked member adapted to enter the perforation in the trap door when the latter is in motion, so as to elevate the spacer, remove it from its frictional contacting surface and permit its discharge.

This specification signed this 16th day of June, 1931.

FRANCIS X. MALOCSAY.